US012691516B2

(12) United States Patent
Vogel

(10) Patent No.: US 12,691,516 B2
(45) Date of Patent: Jul. 28, 2026

(54) HORIZONTAL WIRE ELECTRICAL DISCHARGE MACHINING

(71) Applicant: EDM Network, Inc., Sugar Grove, IL (US)

(72) Inventor: Ron C. Vogel, Sugar Grove, IL (US)

(73) Assignee: EDM Network, Inc., Sugar Grove, IL (US)

( * ) Notice: Subject to any disclaimer, the term of this patent is extended or adjusted under 35 U.S.C. 154(b) by 913 days.

(21) Appl. No.: 18/070,178

(22) Filed: Nov. 28, 2022

(65) Prior Publication Data

US 2024/0173785 A1 May 30, 2024

(51) Int. Cl.
| | |
|---|---|
| *B23H 7/02* | (2006.01) |
| *B23H 7/10* | (2006.01) |
| *B23H 11/00* | (2006.01) |

(52) U.S. Cl.
CPC ............... *B23H 7/10* (2013.01); *B23H 11/00* (2013.01)

(58) Field of Classification Search
CPC ........ B23H 7/10; B23H 11/00; B23H 11/003; B23H 9/00; B23H 7/02
See application file for complete search history.

(56) References Cited

U.S. PATENT DOCUMENTS

| | | | |
|---|---|---|---|
| 2019/0076946 A1* | 3/2019 | Makino | B23H 7/102 |
| 2019/0134728 A1* | 5/2019 | Katogi | B23H 7/10 |
| 2019/0283161 A1* | 9/2019 | Yun | B29C 64/245 |
| 2022/0001473 A1* | 1/2022 | Knaak | B23H 7/105 |
| 2023/0060166 A1* | 3/2023 | Watanabe | B23H 7/10 |

* cited by examiner

*Primary Examiner* — Tiffany T Tran
(74) *Attorney, Agent, or Firm* — Spencer Fane LLP; Steven J. Laureanti

(57) ABSTRACT

A system and method provide for a horizontal wire electrical discharge machining apparatus, including a gantry frame positioned above a worktable to support a workpiece, a reciprocating cutting wire spooled to and from a single drum spool through wire guides and an automatic wire tensioner, wherein during operation the reciprocating cutting wire is pulsed with electric current to erode a surface of the workpiece and the worktable supporting a build plate and the workpiece. The machining apparatus also includes a submersion tank containing deionized water to submerge a face of the build plate and a series of pulleys, the wire guides and the automatic wire tensioner arranged to position the reciprocating cutting wire parallel to the face of the build plate and below a surface of the deionized water in the submersion tank.

20 Claims, 6 Drawing Sheets

HORIZONTAL WIRE ELECTRICAL DISCHARGE MACHINING

TECHNICAL FIELD

The present disclosure relates generally to metal machining equipment and more particularly to wire electrical discharge machining.

BACKGROUND

Additive manufacturing, also sometimes called "3D printing," is a process to produce various materials, generally used to produce a physical reproduction of a 3D model. Additive manufacturing allows for the production of very complex pieces which would be difficult to produce using traditional methods. Many materials, including metals, can be used in additive manufacturing. Additive manufacturing can be performed with a number of metal materials, including aluminum and aluminum alloys, steel, titanium and titanium alloys, among others. When performing additive manufacturing of metal components, a laser is used to fuse metal particles together and build up from a base (or "build plate") layer by layer to reproduce the 3D model. As additive manufacturing technology has improved, larger and heavier metal pieces can now be produced. However, these larger and heavier pieces have brought additional challenges, not the least of which is quickly and easily separating the manufactured pieces from the attached build plate.

Wire electrical discharge machining is a machining process which can quickly and accurately cut any electrically conductive metal using electrical discharges. Existing wire electrical discharge machining tools are inadequate for separating additively manufactured metal pieces from build plates, as the existing configurations of such machines are limited in the size and weight of pieces that can be machined. Thus, existing additive manufacturing processes rely on slow and inaccurate machining processes in order to separate manufactured pieces from build plates, which is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
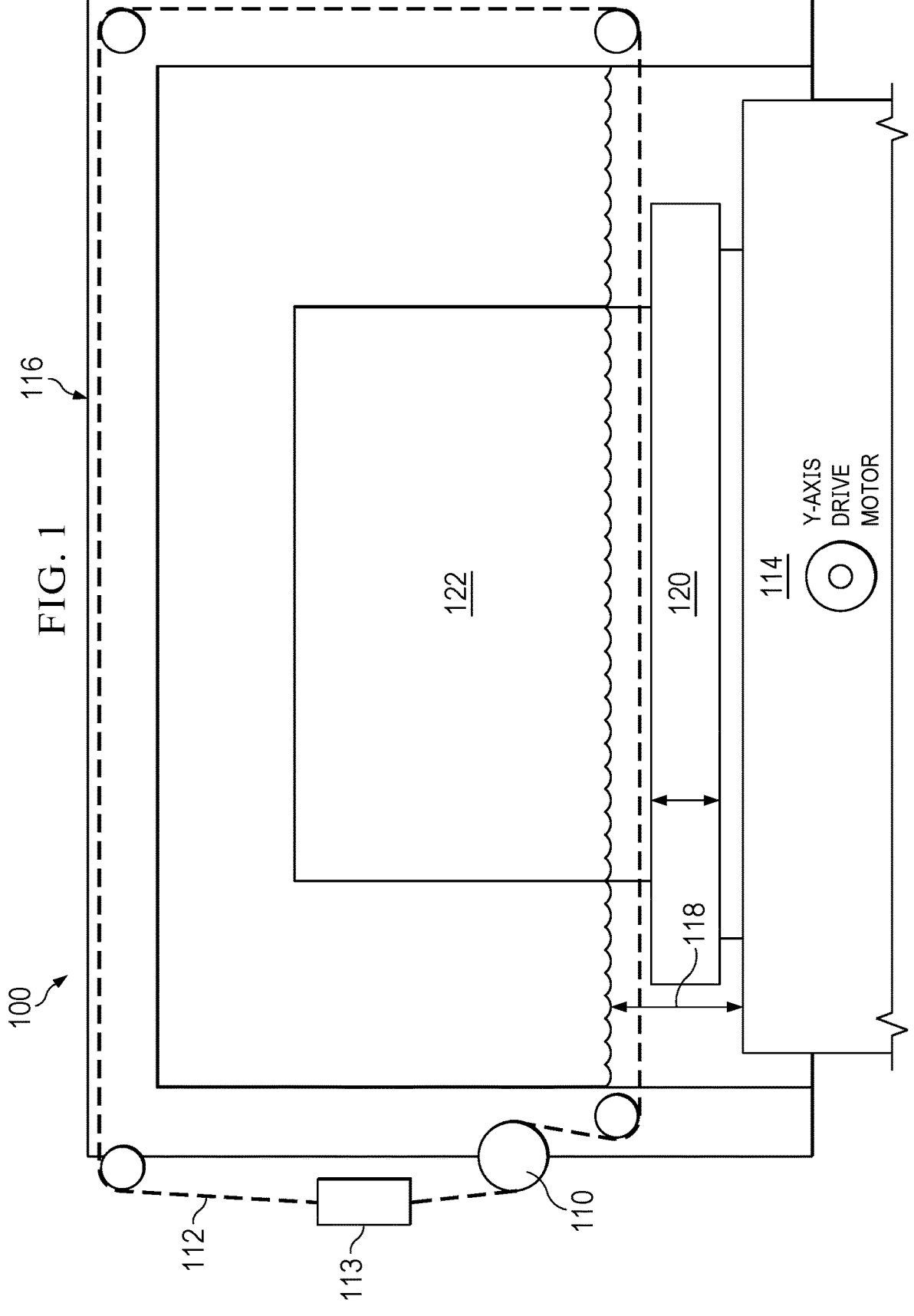
FIG. 1 illustrates a side view of a horizontal submerged fast wire electrical discharge machining tool, according to an embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention. It should be noted that there are many different and alternative configurations, devices and technologies to which the disclosed inventions may be applied. The full scope of the inventions is not limited to the examples that are described below.

Embodiments of the below disclosure enable the use of a submerged horizontal fast wire electrical discharge machining machine. Use of embodiments allows for additively manufactured (that is "3D printed") metal pieces to be quickly, accurately and easily separated from their build plates. Existing wire electrical discharge machining systems are typically in a vertical alignment, and utilize a length of wire to machine pieces. However, this vertical alignment restricts the size and weight of pieces that can be machined using this process, meaning large 3D printed pieces cannot typically be separated from their build plates using vertical wire electrical discharge machining.

There exists horizontal wire electrical discharge machining systems that can be used to separate 3D printed metal pieces from build plates. However, these existing horizontal wire electrical discharge machining systems utilize a rotational system to invert the 3D printed pieces (that is, to have the build plate above the piece to be separated). This inversion is done to protect the horizontal wire, so that the separate pieces fall away from the wire into a basket or other catching system. This inversion process and catching system both restrict the size and weight of pieces that can be cut on such systems. Additionally, because the wire is above the pieces to be cut, the pieces, build plate and wire all need to be fully submerged in such systems, which requires an excessively expensive and large submersion tank, or otherwise acts as yet another limit on the size and weight of pieces that can be cut.

Embodiments of this disclosure avoid the problems associated with existing horizontal wire electrical discharge machining systems, by placing the wire above the build plate, requiring only the wire itself to be submerged. This arrangement significantly reduces the size of the associated submersion tank and also allows for the machining of significantly larger and heavier pieces compared to existing horizontal wire electrical discharge machining systems, by as much as double in all size dimensions and double in weight. Additionally, embodiments enable a horizontal wire electrical discharge machining tool that requires less motorized and moving parts, allowing for easier and more cost effective maintenance compared to existing horizontal wire electrical discharge machining systems, without sacrificing the accuracy and speed of the electrical discharge machining process.

FIG. 1 illustrates electrical discharge machining tool 100, which is a horizontal submerged wire electrical discharge machining tool. According to embodiments, electrical discharge machining tool 100 comprises one wire spool 110 which reciprocating molybdenum wire 112 through the surface of build plate 120, then back to wire spool 110. In other embodiments, molybdenum wire 112 may be replaced with a brass wire. Electrical discharge machining tool 100 further comprises worktable 114, overhead support 116 and submersion tank 118. In this embodiment, electrical discharge machining tool 100 is used to separate workpiece 122 from build plate 120. In general, workpiece 122 may have previously been produced by an additive manufacturing or 3D printing process, and so remains attached to build plate 120 as workpiece 122 is built up from build plate 120 in layers as part of the 3D printing process.

Wire spool 110 is a double direction wire drum with a motor. In other embodiments, only wire spool 110 may feature a motor while the rollers rely on the motion of wire spool 110 to reciprocate molybdenum wire 112. Wire spool 110 may hold a length of molybdenum wire 112, which is reciprocated back and forth continuously during the cutting process.

Molybdenum wire 112 comes off of single drum spool 110, travels through a series of pulleys then through one wire guide, across the surface of build plate 120 in a horizontal attitude, through 3D printed workpiece 122, then through the opposite wire guide, through additional pulleys up through support gantry 116 and back to single drum spool 110, after passing through automatic wire tensioner 113. Upon completion of this cycle, single drum spool 110 reverses direction and molybdenum wire 112 now travels in the opposite direction. Molybdenum wire 112 is traveling at approximately 5 meters per second in each direction to aid in the rapid removal of tiny electrical discharge machining chips. Submerged cutting area 118 also aids in the chip removal and keeping the cutting area cooled.

As molybdenum wire 112 advances in the Y-axis direction, a large or heavy workpiece 112 can be supported from overhead gantry 116 or from the placement of 0.008" thick shims to keep workpiece 112 or pieces cut therefrom from falling onto molybdenum wire 112 and possibly breaking molybdenum wire 112.

Worktable 114 is a surface on which build plate 120 may be placed to allow electrical discharge machining tool 100 to machine workpiece 122. In an embodiment, wire spool 110 may be affixed to worktable 114 so as to allow worktable 114 to move in one direction, allowing molybdenum wire 112 to make cuts to be made to workpiece 122 by moving worktable 114. In such an embodiment, the Y axis, stand column, Z1 and Z2 axes moving worktable 114 may be servo motor driven to allow alignment of molybdenum wire 112 to the face of build plate 120. Further, the column Z1 and Z2 may both be equipped with digital scales, making it easy to adjust molybdenum wire 114 to be parallel to build plate 120. In an embodiment, worktable 114 has a dimension of 1400 mm×1100 mm, a single direction travel of 1400 mm and a maximum loading of 3000 kg.

Overhead support 116 is a gantry frame hung above worktable 114. Overhead support 116 supports workpiece 122 as it is cut from build plate 120, in order to protect molybdenum wire 114. In an embodiment, the top of overhead support 116 is approximately 1200-1300 mm from the surface of worktable 114. In some embodiments, workpiece 122 may have been 3D printed to include a hook or small hole at the top of workpiece 122, in order to support a 3D printed workpiece. In such embodiments, the hook or small hole may be removed from workpiece 122 after the machining performed by electrical discharge machining tool 100 is complete. In still other embodiments, overhead support 116 may include one or more cords attached to support workpiece 122. In such embodiments, electrical discharge machining tool 100 may be able to cut multiple workpieces from build plate 120 in the same cutting session, if a separate cord is attached to each of the multiple workpieces.

Submersion tank 118 is a tank of deionized water with a special additive to allow the water to adhere to molybdenum wire 112 to keep molybdenum wire 112 cool, as well as to remove small metal particles from the kerf created from the electrical discharge machining process. Submersion tank 118 is deep enough to hold enough dielectric to cover molybdenum wire 112, worktable 114 as well as build plate 120. In embodiments submersion tank 118 may submerge up to 300 mm of dielectric.

Build plate 120 is the base of workpiece 122, used in a 3D printing process to build workpiece 122 layer by layer on top of build plate 120. Build plate 120 is on worktable 114, configured upright so that workpiece 122 is not inverted, and build plate 120 lies below molybdenum wire 112 while workpiece 122 lies above molybdenum wire 112. In an embodiment, the possible size of workpiece 122 is 1000× 1000×1000 mm.

In order to operate electrical discharge machining tool 100, build plate 120 and workpiece 122 are placed inside electrical discharge machining tool 100, and overhead support 116 is attached to the top of workpiece 122. An operating panel may be used to select a particular cutting program based on the size of build plate 120 and workpiece 122 specifying the height of build plate 120 (so as to adjust the height of wire spool 110, and the cutting surface of workpiece 122. electrical discharge machining tool 100 then reciprocates molybdenum wire 112 from wire spool 110 through a series of rollers then back onto wire spool 110, and sends electrical pulses through molybdenum wire 112 to erode small sections of workpiece 122, also known as the wire electrical discharge machining process. electrical discharge machining tool 100 performs this wire electrical discharge machining process repeatedly, moving worktable 112 to pass all of workpiece 122 through molybdenum wire 112 until workpiece 122 is separated from build plate 120. Thereafter, workpiece 122 may be lifted out of electrical discharge machining tool 100.

Figure 2:
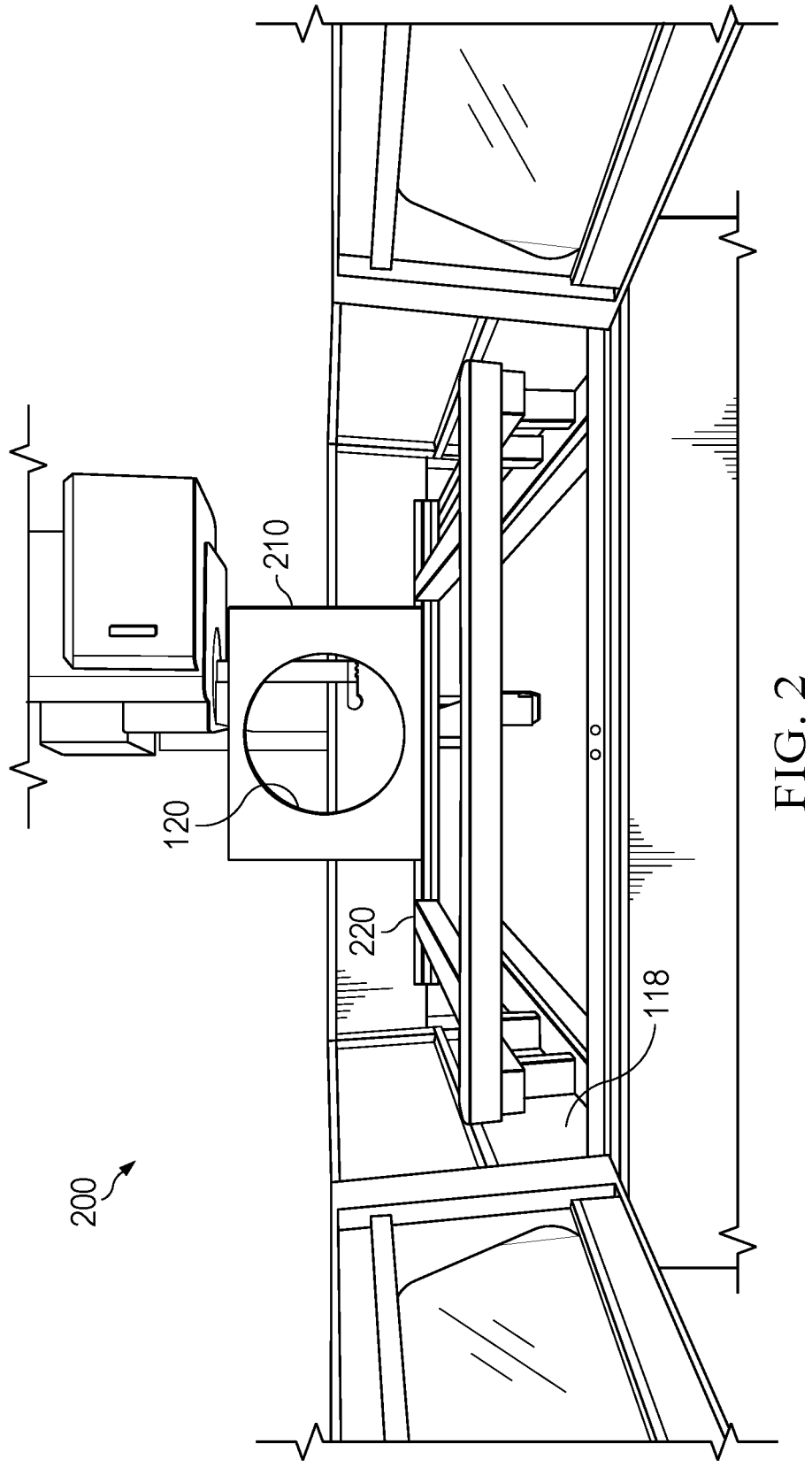
FIG. 2 illustrates a perspective view of a vertical non-submerged fast wire electrical discharge machining tool, according to an embodiment.

FIG. 2 is a perspective view of vertical non-submerged fast wire electrical discharge machining tool 200, according to an embodiment. As compared to the embodiment shown in FIG. 1, vertical non-submerged fast wire electrical discharge machining tool 200 comprises fixture plate 210 supporting build plate 120, as well as ledge 220 to rest the parts or workpieces attached to build plate 120.

Figure 3:
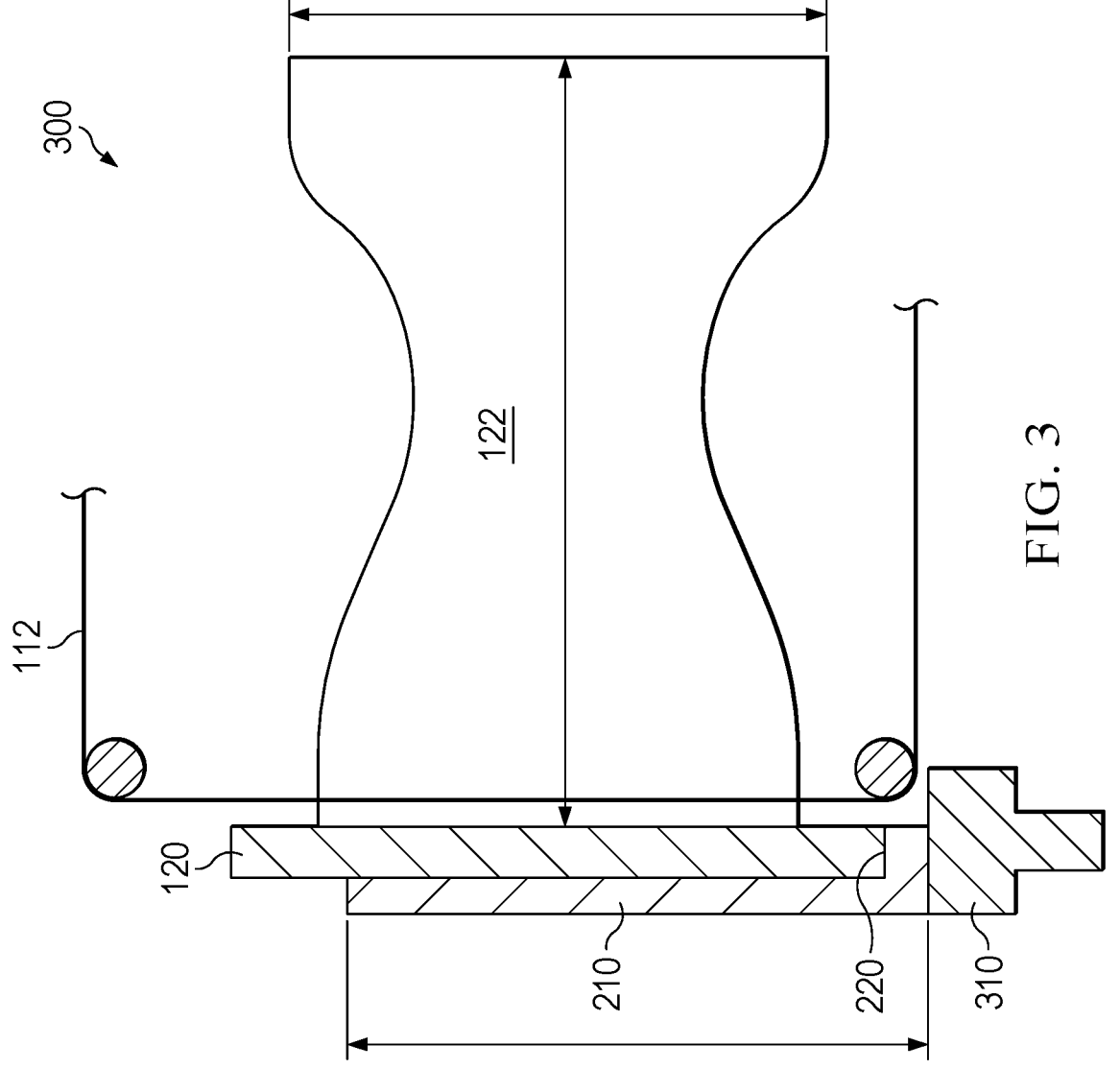
FIG. 3 illustrates a side view of a vertical non-submerged fast wire electrical discharge machining tool, according to an embodiment.

FIG. 3 illustrates electrical discharge machining tool 300, which is a vertical non-submerged fast wire electrical discharge machining tool in a second embodiment. electrical discharge machining tool 300 is shown rotated 90 degrees from normal operating configuration to better illustrate the components of electrical discharge machining tool 300. As compared to the embodiment illustrated in FIG. 1, electrical discharge machining tool 300 comprises support plate 210 oriented vertically, build plate 120, as well as ledge 220 to support build plate 120. electrical discharge machining tool 300 further comprises back rail 310, which may be part of worktable 112 used to support plate 210.

Figure 4A:
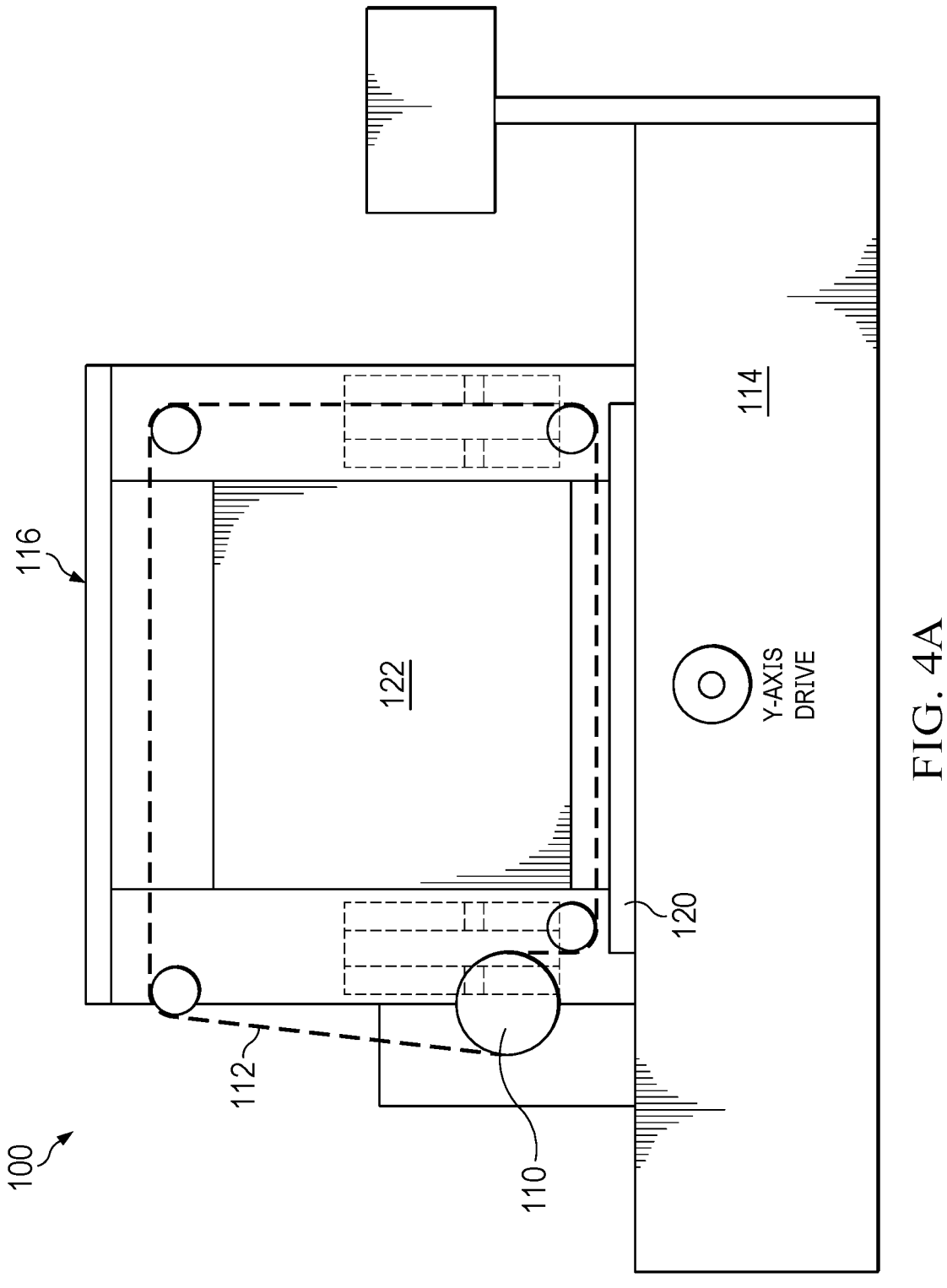
FIGS. 4A-C illustrate perspective views of the horizontal submerged fast wire electrical discharge machining tool of FIG. 1, according to an embodiment.
Figure 4B:
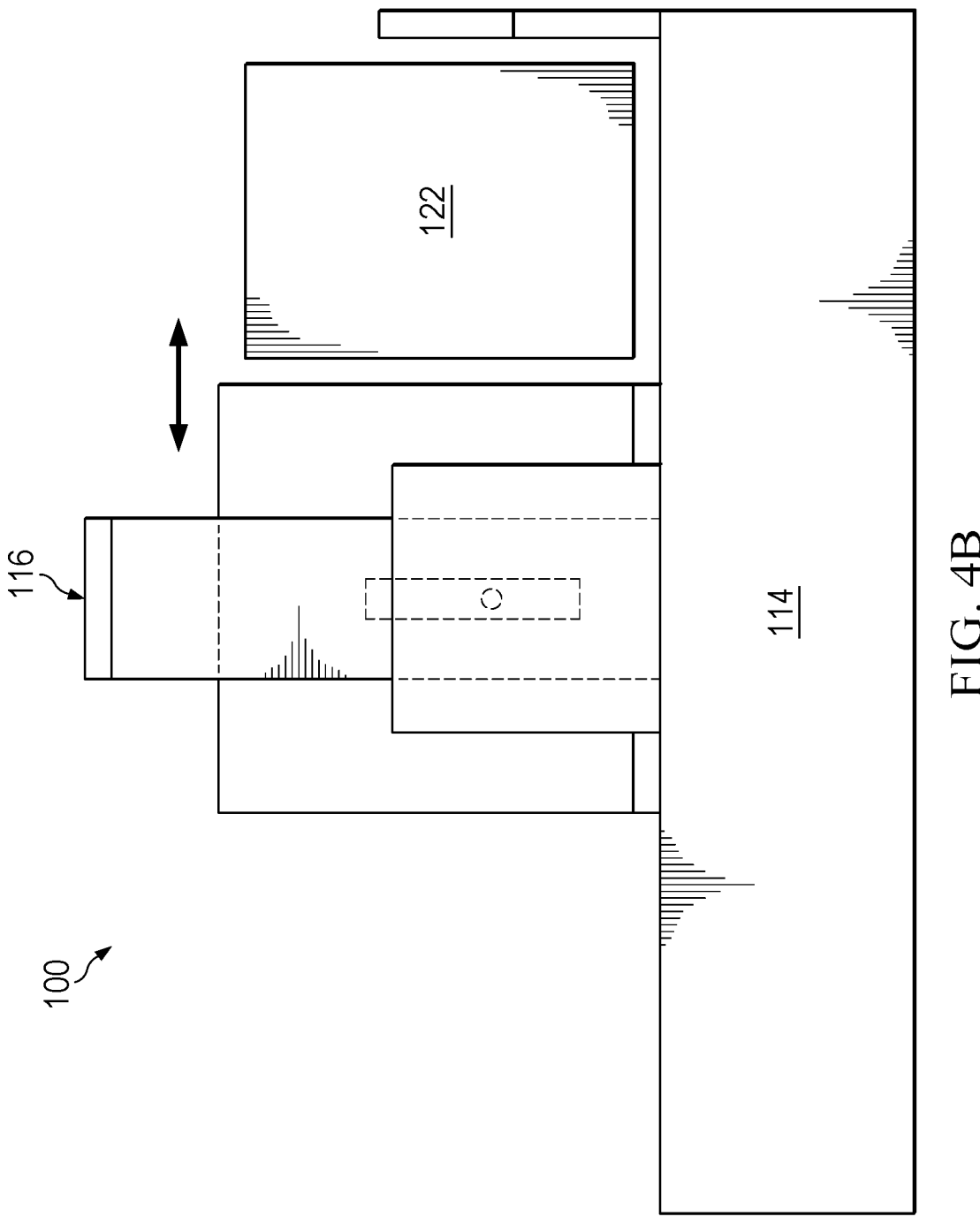
Figure 4C:
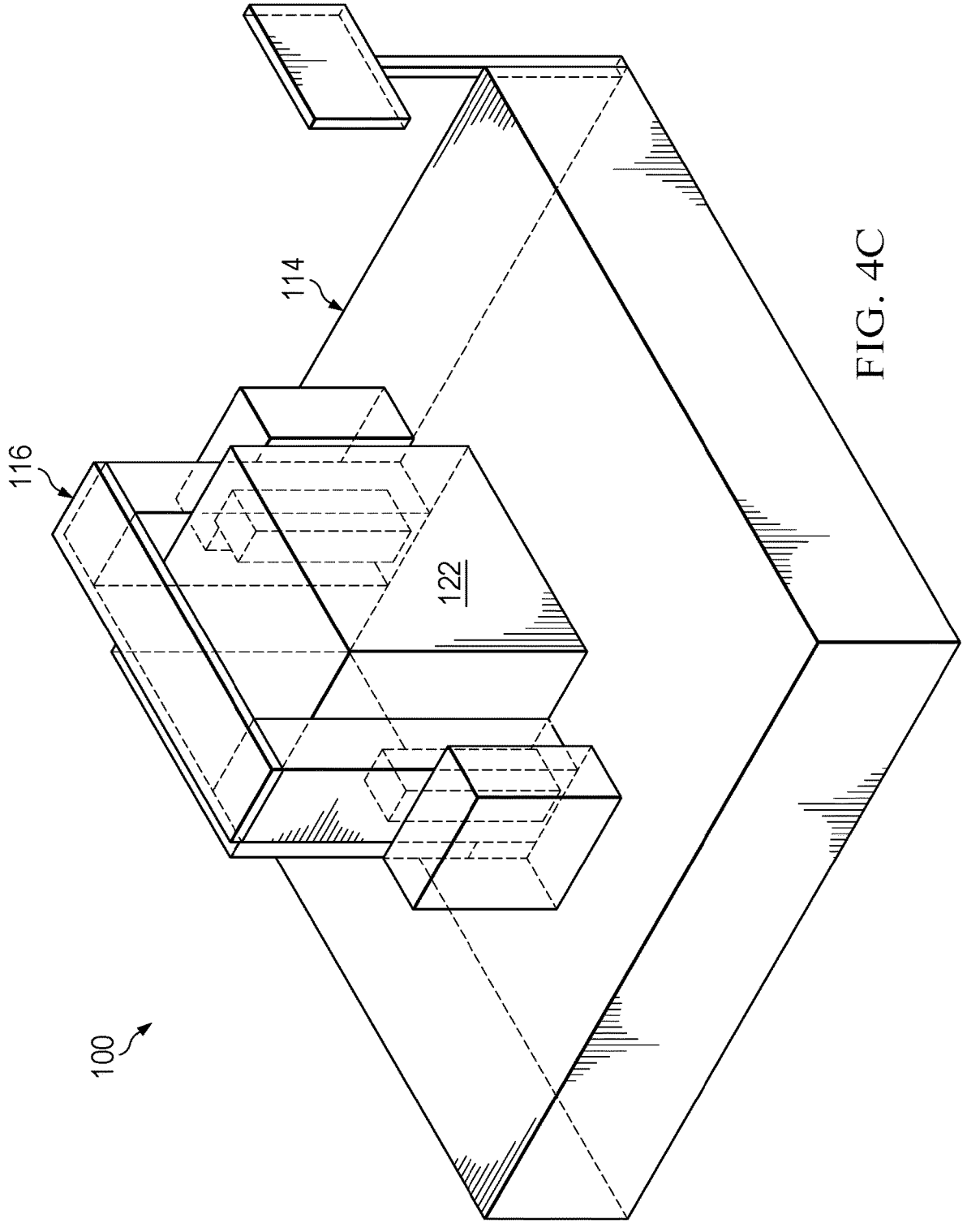

FIGS. 4A-C are perspective views of the horizontal submerged fast wire electrical discharge machining tool 100, according to an embodiment.

FIG. 4A illustrates horizontal submerged fast wire electrical discharge machining tool 100. By mounting large build plates 120 and heavy workpieces 122 horizontally instead of vertically, when workpiece 122 separates from build plate 120, workpiece 122 may only fall approximately 0.008", which is the width of wire 112 kerf. To prevent damage from falling this distance, small 0.008" thick shims may be used to support heavy workpiece 122 from crushing and breaking a 0.007" wire. With additional overhead support 116, very large and heavy workpieces 122 can be wire cut. Worktable 114 can be moved to allow for easy loading of heavy and large workpieces 122 from an overhead crane or forklift (not illustrated).

In the vertical cutting process used by the machines shown in FIGS. 2 and 3, cooling water is flows down with gravity through the wire kerf. In this horizontal cutting process, the cutting area may need to be submerged to cool the wire and assist in removing the electrical discharge machining chips as gravity does not assist in the horizontal orientation.

By submerging horizontal build plate 122 (shown as submerged 8" deep in FIG. 5 below) and the cut area of a printed part, such as workpiece 122, wire 112 may be kept cool during the cutting process. Submersion may also assist in removing the small "electrical discharge machining chips" resulting from the electrical discharge machining cutting process. Horizontal part orientation also allows for cutting very tall 3D printed workpieces as there is no restriction on the part height, as gantry 116 can be modified at the factory to accommodate taller workpieces.

FIG. 4B shows a profile view of horizontal submerged fast wire electrical discharge machining tool 100, according to an embodiment. As shown in FIG. 4B, worktable 114 can be moved along an axis to move workpiece 122 in and out of the cutting frame. FIG. 4C shows an isometric view of horizontal submerged fast wire electrical discharge machining tool 100, according to an embodiment.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been illustrated and described, it will be understood that various changes and modifications to the foregoing embodiments may become apparent to those skilled in the art without departing from the spirit and scope of the present invention.

The invention claimed is:

1. A horizontal wire electrical discharge machining apparatus, comprising:
    a gantry frame positioned above a worktable to support a workpiece;
    a reciprocating cutting wire spooled to and from a single drum spool through wire guides and an automatic wire tensioner, wherein during operation the reciprocating cutting wire is pulsed with electric current to erode a surface of the workpiece;
    the worktable supporting a build plate and the workpiece, the worktable movable along a single axis when driven by a servo motor;
    a submersion tank containing deionized water to submerge a face of the build plate; and
    a series of pulleys, the wire guides and the automatic wire tensioner arranged to position the reciprocating cutting wire parallel to the face of the build plate and below a surface of the deionized water in the submersion tank.

2. The horizontal wire electrical discharge machining apparatus of claim 1, wherein the reciprocating cutting wire comprises molybdenum wire.

3. The horizontal wire electrical discharge machining apparatus of claim 1, wherein the workpiece is manufactured by a 3D metal printing process.

4. The horizontal wire electrical discharge machining apparatus of claim 3, wherein the workpiece comprises an electrically conductive material.

5. The horizontal wire electrical discharge machining apparatus of claim 3, wherein the electrically conductive material comprises steel alloy.

6. The horizontal wire electrical discharge machining apparatus of claim 3, wherein the electrically conductive material comprises aluminum alloy.

7. The horizontal wire electrical discharge machining apparatus of claim 3, wherein the electrically conductive material comprises titanium alloy.

8. The horizontal wire electrical discharge machining apparatus of claim 1, further comprising one or more servo motors that adjust one or more axes of the worktable to align the reciprocating cutting wire to the face of the build plate.

9. The horizontal wire electrical discharge machining apparatus of claim 1, further comprising a support cord attached to the gantry frame, wherein the support cord supports the workpiece during operation of horizontal wire electrical discharge machining apparatus.

10. The horizontal wire electrical discharge machining apparatus of claim 1, further comprising a plurality of support cords attached to the gantry frame, wherein the support cords support the workpiece attached to the build plate.

11. A method for separating a workpiece from a build plate, comprising:
    manufacturing, using a 3D printing process, the workpiece, wherein the workpiece is attached to the build plate;
    placing the workpiece and the build plate into a horizontal wire electrical discharge machining apparatus, the horizontal wire electrical discharge machining apparatus comprising:
        a gantry frame positioned above a worktable to support the workpiece;
        a reciprocating cutting wire spooled to and from a single drum spool through wire guides and an automatic wire tensioner, wherein during operation the reciprocating cutting wire is pulsed with electric current to erode a surface of the workpiece;
        the worktable supporting the build plate and the workpiece, the worktable movable along a single axis when driven by a servo motor;
        a submersion tank containing deionized water to submerge a face of the build plate; and
        a series of pulleys, the wire guides and the automatic wire tensioner arranged to position the reciprocating cutting wire parallel to the face of the build plate and below a surface of the deionized water in the submersion tank; and
    operating the horizontal wire electrical discharge machining apparatus to separate the workpiece from the build plate.

12. The method of claim 11, wherein the reciprocating cutting wire comprises molybdenum wire.

13. The method of claim 11, wherein the workpiece comprises a conductive metal alloy.

14. The method of claim 13, wherein the conductive metal alloy comprises steel alloy.

15. The method of claim 13, wherein the conductive metal alloy comprises aluminum alloy.

16. The method of claim 13, wherein the conductive metal alloy comprises titanium alloy.

17. The method of claim 13, wherein the conductive metal alloy comprises a 3D printable metal alloy.

18. The method of claim 11, further comprising adjusting, by one or more servo motors, one or more axes of the worktable to align the reciprocating cutting wire to the face of the build plate.

19. The method of claim 11, wherein the horizontal wire electrical discharge machining apparatus further comprises a support cord attached to the gantry frame, wherein the support cord supports the workpiece during operation of horizontal wire electrical discharge machining apparatus.

20. The method of claim 11, wherein the horizontal wire electrical discharge machining apparatus further comprises a plurality of support cords attached to the gantry frame, wherein the support cords support the workpiece attached to the build plate.

* * * * *